US010831499B2

United States Patent
Bouzguarrou et al.

(10) Patent No.: US 10,831,499 B2
(45) Date of Patent: Nov. 10, 2020

(54) APPARATUS AND METHOD FOR PERFORMING BRANCH PREDICTION

(71) Applicant: Arm Limited, Cambridge (GB)

(72) Inventors: Houdhaifa Bouzguarrou, Valbonne (FR); Guillaume Bolbenes, Antibes (FR); Frederic Claude Marie Piry, Cagnes-sur-Mer (FR); Albin Pierrick Tonnerre, Nice (FR)

(73) Assignee: ARM LIMITED, Cambridge, MA (US)

( * ) Notice: Subject to any disclaimer, the term of this patent is extended or adjusted under 35 U.S.C. 154(b) by 108 days.

(21) Appl. No.: 16/106,382

(22) Filed: Aug. 21, 2018

(65) Prior Publication Data

US 2020/0065111 A1 Feb. 27, 2020

(51) Int. Cl.
*G06F 15/00* (2006.01)
*G06F 7/38* (2006.01)
*G06F 9/00* (2006.01)
*G06F 9/44* (2018.01)
*G06F 9/38* (2018.01)
*G06F 9/32* (2018.01)

(52) U.S. Cl.
CPC ............ *G06F 9/3844* (2013.01); *G06F 9/325* (2013.01); *G06F 9/381* (2013.01); *G06F 9/3806* (2013.01)

(58) Field of Classification Search
CPC ...... G06F 9/3844; G06F 9/325; G06F 9/3806; G06F 9/381
USPC ........................................................ 712/241
See application file for complete search history.

(56) References Cited

U.S. PATENT DOCUMENTS

| | | | | |
|---|---|---|---|---|
| 2015/0227374 A1* | 8/2015 | Blasco | .................. | G06F 9/3806 |
| | | | | 712/240 |
| 2018/0349140 A1* | 12/2018 | Rasale | .................... | G06F 8/445 |

\* cited by examiner

*Primary Examiner* — Chun Kuan Lee
(74) *Attorney, Agent, or Firm* — Nixon & Vanderhye PC

(57) ABSTRACT

An apparatus and method are provided for performing branch prediction. The apparatus has processing circuitry for executing instructions, and branch prediction circuitry for making branch outcome predictions in respect of branch instructions. The branch prediction circuitry includes loop prediction circuitry having a plurality of entries, where each entry is used to maintain branch outcome prediction information for a loop controlling branch instruction that controls repeated execution of a loop comprising a number of instructions. The branch prediction circuitry is arranged to analyse blocks of instructions and to produce a prediction result for each block that is dependent on branch outcome predictions made for any branch instructions appearing in the associated block. A prediction queue then stores the prediction results produced by the branch prediction circuitry in order to determine the instructions to be executed by the processing circuitry. When the block of instructions being analysed comprises a loop controlling branch instruction that has an active entry in the loop prediction circuitry, and a determined condition is detected in respect of the associated loop, the loop prediction circuitry is arranged to produce a prediction result that identifies multiple iterations of the loop. This can significantly boost prediction bandwidth for certain types of loop.

17 Claims, 11 Drawing Sheets

ENTRIES IN LOOP SPECIAL CONDITION DETECTOR

| TAG | LOOP SIZE | CONFIDENCE |
|-----|-----------|------------|
| 605 | 610 | 615 |
|     |           |            |

610: USED TO TRACK WHEN ITERATION OF LOOP COMPLETE

600

FIG. 9

APPARATUS AND METHOD FOR PERFORMING BRANCH PREDICTION

BACKGROUND

The present technique relates to an apparatus and method for performing branch prediction.

In order to seek to increase the performance of data processing systems, it is known to use branch prediction circuitry to seek to make predictions in respect of branch instructions. The predictions are then used by fetch circuitry to determine the instructions to be fetched from memory for execution by the processing circuitry of the data processing system. In particular, branch instructions can cause a change in flow of the instructions being executed, dependent on whether the branch is taken or not taken. If the system were merely to wait until the processing circuitry has executed the branch instruction (and hence it is known whether the branch is taken or not taken) before fetching the next instructions to be executed, this would have a significant impact on performance. Instead, branch prediction circuitry is used to seek to predict whether a branch will be taken or not taken, so that the fetch circuitry can continue to fetch instructions on the basis of that prediction. If the prediction later proves wrong, then the processing pipeline can be flushed, and processing can be resumed from the point of misprediction.

The branch prediction circuitry can be arranged to analyse blocks of instructions at a time, seeking to detect any branch instruction(s) within the block, and to predict whether any such branch is taken or not taken. A prediction result can then be produced identifying the sequential instructions between a first instruction in the block and the first branch instruction in the block that is predicted as taken. However, the branch prediction circuitry will typically only be able to review a small number of blocks of instructions per cycle (for example two blocks), and in sections of code where there are a significant number of branch instructions, this may mean that only a small number of instructions are identified in the prediction result of each block. This can lead to a loss of performance. It would be desirable to provide a mechanism which alleviated this performance issue.

SUMMARY

In one example configuration, there is provided an apparatus comprising: processing circuitry to execute instructions; branch prediction circuitry to make branch outcome predictions in respect of branch instructions; the branch prediction circuitry including loop prediction circuitry having a plurality of entries, each entry being used to maintain branch outcome prediction information for a loop controlling branch instruction that controls repeated execution of a loop comprising a number of instructions; the branch prediction circuitry being arranged to analyse blocks of instructions and to produce a prediction result for each block that is dependent on branch outcome predictions made for any branch instructions appearing in the associated block; and a prediction queue to store the prediction results produced by the branch prediction circuitry in order to determine the instructions to be executed by the processing circuitry; wherein when the block of instructions being analysed comprises a loop controlling branch instruction that has an active entry in the loop prediction circuitry, and a determined condition is detected in respect of the associated loop, the loop prediction circuitry is arranged to produce a prediction result that identifies multiple iterations of the loop.

In another example configuration, there is provided a method of performing branch prediction in an apparatus having processing circuitry for executing instructions, and branch prediction circuitry for making branch outcome predictions in respect of branch instructions, the method comprising: providing within the branch prediction circuitry loop prediction circuitry having a plurality of entries, each entry being used to maintain branch outcome prediction information for a loop controlling branch instruction that controls repeated execution of a loop comprising a number of instructions; employing the branch prediction circuitry to analyse blocks of instructions and to produce a prediction result for each block that is dependent on branch outcome predictions made for any branch instructions appearing in the associated block; and storing within a prediction queue the prediction results produced by the branch prediction circuitry, in order to determine the instructions to be executed by the processing circuitry; when the block of instructions being analysed comprises a loop controlling branch instruction that has an active entry in the loop prediction circuitry, and a determined condition is detected in respect of the associated loop, employing the loop prediction circuitry to produce a prediction result that identifies multiple iterations of the loop.

In a yet further example configuration, there is provided an apparatus comprising: processing means for executing instructions; branch prediction means for making branch outcome predictions in respect of branch instructions; the branch prediction means including loop prediction means having a plurality of entries, each entry being used to maintain branch outcome prediction information for a loop controlling branch instruction that controls repeated execution of a loop comprising a number of instructions; the branch prediction means for analysing blocks of instructions and for producing a prediction result for each block that is dependent on branch outcome predictions made for any branch instructions appearing in the associated block; and prediction queue means for storing the prediction results produced by the branch prediction means in order to determine the instructions to be executed by the processing means; wherein when the block of instructions being analysed comprises a loop controlling branch instruction that has an active entry in the loop prediction circuitry, and a determined condition is detected in respect of the associated loop, the loop prediction means is arranged to produce a prediction result that identifies multiple iterations of the loop.

BRIEF DESCRIPTION OF THE DRAWINGS

The present technique will be described further, by way of example only, with reference to examples thereof as illustrated in the accompanying drawings, in which:

FIG. 9 illustrates entries that may be provided in a loop special condition detector in accordance with one example configuration.

DESCRIPTION OF EXAMPLES

Figure 1:
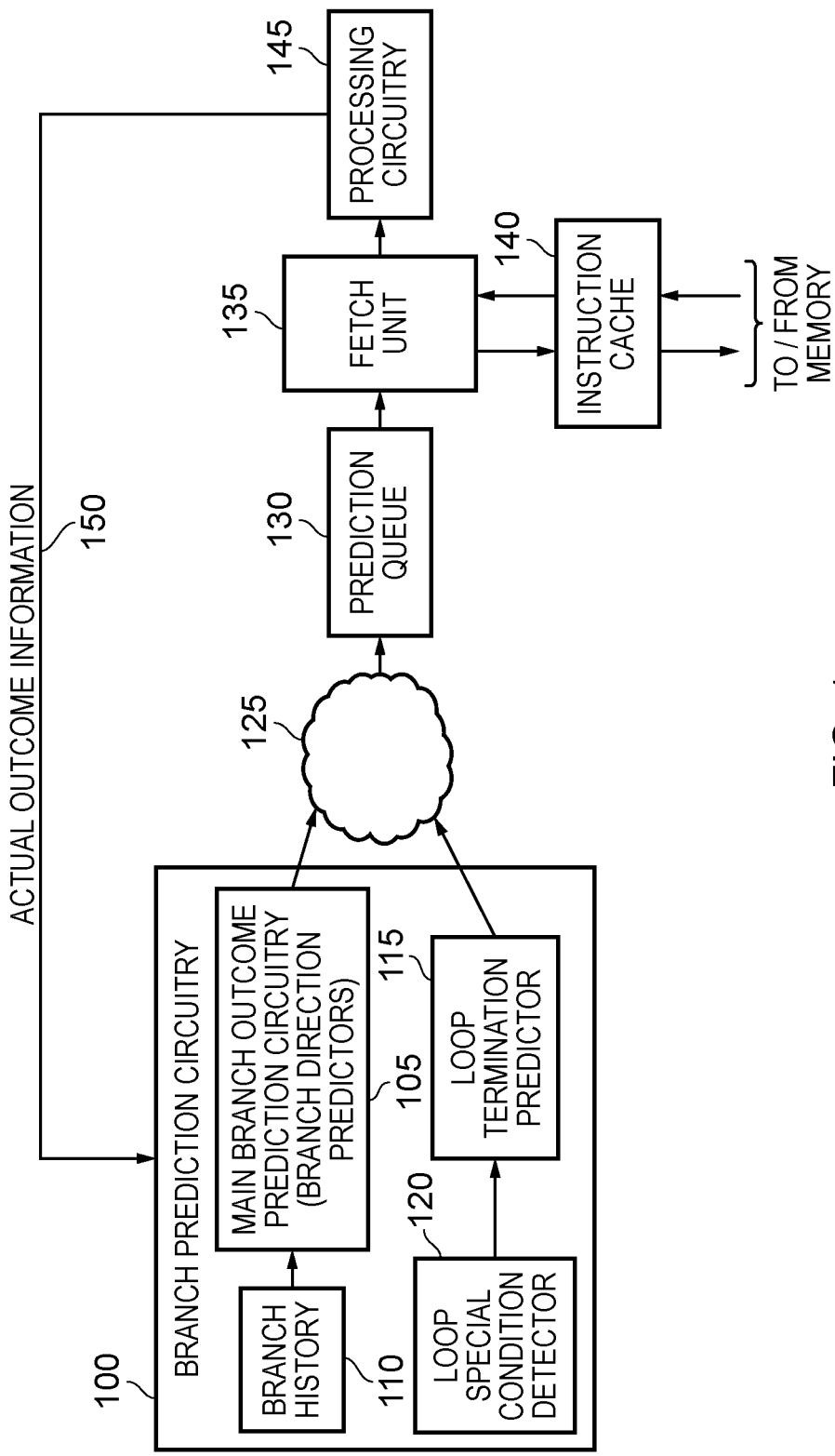
FIG. 1 is a block diagram illustrating an apparatus in accordance with one example.

Branch prediction circuitry may consist of several components that are used when seeking to make branch outcome predictions in respect of branch instructions encountered within a sequence of instructions. These components may consist of general branch direction predictors that seek to predict whether a branch is taken or not taken, but may also include one or more components that seek to make predictions in respect of particular types of branch instructions. For example, loop prediction circuitry may be provided for seeking to make branch outcome predictions in respect of loop controlling branch instructions, loop controlling branch instructions being branch instructions that control repeated execution of a loop comprising a number of instructions. Hence, when analysing a particular block of instructions, if a branch instruction is detected that is considered to be a loop controlling branch instruction, then the loop prediction circuitry may be used to make the branch outcome prediction for that branch instruction rather than the general branch direction predictors.

This can improve overall accuracy in the branch predictions made, but the above-mentioned performance issues can still arise when sections of code are encountered that have a relatively high number of branch instructions. This is due to the fact that in a single block of instructions being considered, the prediction result will only identify one or more instructions up to the point where a taken branch is detected within the block, and this can lead to individual prediction results only identifying a relatively small number of instructions. In accordance with the techniques described herein, when a determined condition is found to exist in respect of a loop for which loop prediction circuitry is maintaining an entry for the corresponding loop controlling branch instruction, a mechanism is provided that enables the resultant prediction result to identify more instructions, thereby alleviating the above-mentioned performance issue.

In particular, in one example arrangement an apparatus is provided that has processing circuitry for executing instructions, and branch prediction circuitry to make branch outcome predictions in respect of branch instructions. The branch prediction circuitry includes loop prediction circuitry having a plurality of entries, where each entry is used to maintain branch outcome prediction information for a loop controlling branch instruction.

The branch prediction circuitry is arranged to analyse blocks of instructions and to produce a prediction result for each block that is dependent on branch outcome predictions made for any branch instructions appearing in the associated block. A prediction queue is then used to store the prediction results produced by the branch prediction circuitry in order to determine the instructions to be executed by the processing circuitry.

In accordance with the techniques described herein, when the block of instructions being analysed comprises a loop controlling branch instruction that has an active entry in the loop prediction circuitry, and a determined condition is detected in respect of the associated loop, the loop prediction circuitry is arranged to produce a prediction result that identifies multiple iterations of the loop. In particular, when the determined condition is found, it has been realised that the loop prediction circuitry need not only produce a prediction result that relates directly to the one instance of the block of instructions that is currently being considered, but instead can identify the instructions forming the loop associated with the loop controlling branch instruction, and identify a certain number of multiple iterations of the loop that can be performed without any intervening branch prediction being needed. This can significantly boost the prediction bandwidth in the presence of the determined condition, by enabling an increased number of instructions to be identified within the prediction results of the prediction queue.

In one example, following the loop prediction circuitry producing a prediction result that identifies multiple iterations of the loop, the branch prediction circuitry is arranged to resume making branch outcome predictions starting with a block of instructions after the multiple iterations of the loop. This enables the branch prediction circuitry to begin making predictions well ahead of the time the actual instructions are required by the processing circuitry. In particular, whilst the prediction result has identified multiple iterations of the loop, there is no need for the branch prediction circuitry to await execution of those multiple iterations before continuing with its branch prediction activities. Instead, subject to the history information used by the branch prediction circuitry being updated to take into account the fact that multiple iterations of the loop have been predicted by the prediction result, the branch prediction circuitry can then immediately begin making further predictions starting with consideration of a block of instructions that correspond to the instructions that will need to be executed after the multiple iterations of the loop have been executed. This enables the branch prediction circuitry to gain time and predict further ahead of instructions actually being required by the processing circuitry.

Alternatively, if power consumption is more important than performance, it will be appreciated that the same technique can be used to significantly reduce power consumption, by disabling all predictors within the branch prediction circuitry through all of the identified iterations of the loop.

The determined condition that allows the loop prediction circuitry to produce a prediction result that identifies multiple iterations of the loop can take a variety of forms. However, in one implementation the determined condition is that the only branch instructions within the loop are the associated loop controlling branch instruction and any looping branch instruction provided to identify the loop. Depending on the form of the loop controlling branch instruction, there may be no need for a separate looping branch instruction. For example, if the loop controlling branch instruction is provided at the end of the loop, and causes a branch to be taken back to the start of the loop on all iterations other than the final iteration, then no separate looping branch instruction will be required. However, if the loop controlling branch instruction is at the start of the loop, and is not taken for all iterations other than the final iteration, then there will typically be an associated unconditional branch instruction at the end of the loop that forms the looping branch instruction, and is used to branch back to the beginning of the loop.

If it is known that the loop does not contain any other branch instructions other than the associated loop controlling branch instruction (and any looping branch instruction that is used), then it is known that there are no other branch predictions to be made within the body of the loop, and accordingly a single prediction result can be generated that can reliably identify that multiple iterations of the loop can be performed. Such loops may be referred to as simple loops herein, and it is often the case that such loops contain a relatively small number of instructions, and can appear frequently in code. Hence, they are the kinds of loop that can give rise to the performance impact mentioned earlier, where each prediction result only identifies a relatively small number of instructions. By enabling multiple iterations of such simple loops to be identified by a single prediction result, this can significantly improve performance.

However, in some instances it may be appropriate to enable the determined condition to be detected even in the presence of one or more other branch instructions within the loop. In particular, in one example implementation, the determined condition may be that any branch instruction within the loop, other than the loop controlling branch instruction and any looping branch instruction provided to identify the loop, is predicted as not taken. Typically, if there are other branch instructions within the loop, it would not be appropriate to seek to make a single prediction result for multiple iterations, since on each iteration the prediction made in respect of such a branch instruction will depend on the previous history, and hence there could be a change in instruction flow due to such a branch instruction, that would result in the processing circuitry not merely executing multiple iterations of the loop consecutively. However, if it is noted that any such branch instruction within the loop is reliably predicted as not taken, it may be considered appropriate to set the determined condition, so that the performance benefit of producing a single prediction result to identify multiple iterations of the loop can be realised. In instances where that prediction is likely to be correct most of the time, this can enable significant performance benefits to be realised.

The prediction result can take a variety of forms, but in one implementation identifies a first memory address, and an offset value used to identify a number of sequential instructions to be executed starting from the instruction at the first memory address. In one implementation, for the determined condition to be detected as present, an offset field within the prediction result is required to be large enough to specify as the offset value a value identifying the number of instructions in the loop. It has been found that this is often not a significant constraint, since as mentioned earlier the use of the present technique can be very beneficial in association with simple loops, which often only include a relatively small number of instructions, and hence it is often the case that the offset field is big enough to identify the number of instructions in the loop.

In one example implementation, when the block of instructions being analysed comprises a loop whose associated loop controlling branch instruction has an active entry in the loop prediction circuitry, and the determined condition is detected in respect of the loop, the prediction result output by the loop prediction circuitry further identifies an iteration count. The prediction result output by the loop prediction circuitry is then arranged to cause the number of sequential instructions to be executed multiple times, where the multiple times is determined from the iteration count. Hence, in the presence of the determined condition, the first memory address can be used to identify the start of the loop, the offset value can be used to identify the number of sequential instructions within the loop, and the iteration count can be used to identify the number of times the loop should be executed. This can provide a particularly efficient encoding, which can then be deconstructed by the prediction queue in order to determine the sequence of instructions to be provided to the processing circuitry for execution.

There are a number of ways in which the presence of the determined condition can be indicated. In one example implementation, each entry in the loop prediction circuitry comprises a field to identify whether the determined condition has been detected in respect of the loop.

There are a number of ways in which the determined condition can be detected. In one example implementation, this is done with reference to the execution of one or more previous iterations of the loop by the processing circuitry. Since the determination here is made directly on the basis of the actual execution of the loop by the processing circuitry, this provides a highly accurate mechanism for detecting whether the determined condition is present or not. In particular, it may be possible to determine, from observing the actual execution of a single iteration of the loop, whether there are in fact any other branch instructions within the loop, and if not the determined condition can be set straightaway.

However, as an alternative, or in addition, the determined condition may be detected with reference to previous branch predictions made by the branch prediction circuitry in respect of the instructions forming the loop. In particular, using the information about the previous branch predictions, it may be possible to deduce whether there are any other branch instructions within the loop and, if there are, determine whether those branch instructions are reliably indicated as not taken.

The loop prediction circuitry can take a variety of forms. The loop prediction circuitry is arranged to store information that enables predictions to be made for at least a subset of the iterations of the loop. In one particular example implementation, the loop prediction circuitry is loop termination prediction circuitry, each entry in the loop termination prediction circuitry provides an iteration count identifying the number of times the loop is to executed before the loop terminates, and an entry becomes an active entry when a confidence in the iteration count reaches a predetermined level. The confidence is used to seek to determine whether the total iteration count is stable, by monitoring multiple instances of execution of the loop. If the total iterations count is stable the entry can become an active entry whose contents can then be used for predictions.

Hence, using loop termination prediction circuitry, it is possible to provide a reliable branch outcome prediction for the loop controlling branch instruction for each iteration of the loop, once the total number of iterations of the loop is detected to be stable. In particular, once the loop iteration count is stable, and if it is known that the associated loop controlling branch instruction is either taken for all iterations other than the last iteration, or not taken for all iterations other than the last iteration, then a reliable prediction can be made for the loop controlling branch instruction as each iteration is encountered. Further, in situations where the determined condition is detected in respect of the associated loop, the branch prediction circuitry can output a single prediction result that identifies multiple iterations of the loop. This could for example in one implementation identify every iteration of the loop, so that only a single prediction result is required in order to cause all of the iterations of the loop to be performed. However, alternatively the multiple iterations identified may be a subset of the total number of iterations, for example in situations where it is determined that any other branch instruction will be predicted as reliably not taken during that subset of iterations, but the same may not be true of other iterations of the loop.

In one example implementation, the branch outcome prediction information maintained in each entry of the loop termination prediction circuitry identifies an outcome pattern for the associated loop controlling branch instruction. This can be used to determine the predicted outcome for each iteration of the loop.

In one implementation, the outcome pattern identifies one of: the loop controlling branch instruction will be taken N times, and then not taken; the loop controlling branch instruction will not be taken N times, and then will be taken.

In such an example, the multiple iterations identified in the prediction result may be up to N+1 iterations. In one implementation, it may be that the single prediction result will identify up to N iterations, which will all have the same predicted outcome. However, in alternative embodiments the same single prediction result may be used to capture all of the N+1 iterations. In particular, the prediction queue, when decompressing the prediction result that identifies the multiple iterations, can be arranged to determine that the outcome of the branch on the final iteration is opposite to the outcome for all of the other iterations, when deciding what instructions to pass to the processing circuitry for execution. As mentioned earlier, branch prediction will continue from the address that is just after the loop ends, and accordingly further prediction results will identify the instructions that need to be fetched for execution by the processing circuitry after the loop terminates.

As mentioned earlier, the branch prediction circuitry may comprise multiple components. In one implementation the branch prediction circuitry comprises main branch outcome prediction circuitry in addition to the loop prediction circuitry, the main branch outcome prediction circuitry being arranged to make branch outcome predictions for branch instructions based on history information that is maintained in dependence on actual branch outcomes observed by the processing circuitry for branch instructions previously executed by the processing circuitry. The loop prediction circuitry may then be arranged to produce the prediction result for a current block of instructions in preference to the main branch outcome prediction circuitry when the current block contains a loop controlling branch instruction that the loop prediction circuitry has an active entry for. In particular, if no other branch instruction in the block of instructions is encountered before the loop controlling branch instruction, or any such earlier encountered branch instruction is predicted as not taken, then the loop prediction circuitry will be arranged to produce the branch outcome prediction for the loop controlling branch instruction provided it has an active entry for that loop controlling branch instruction. The prediction accuracy from the loop prediction circuitry is expected to be higher than any prediction made using the main branch outcome prediction circuitry for the loop controlling branch instruction.

In one implementation, when the loop prediction circuitry produces a prediction result that identifies multiple iterations of the loop, the branch prediction circuitry is arranged to update the history information to take into account the multiple iterations, before enabling the main branch outcome prediction circuitry to resume making branch outcome predictions for branch instructions. Hence, this enables the main branch outcome prediction circuitry to resume its prediction activities based on an accurate indication of the history information related to previously encountered branch instructions.

Particular examples will now be described with reference to the Figures.

FIG. 1 is a block diagram of a data processing apparatus in accordance with one example implementation. The apparatus includes processing circuitry 145 for executing a sequence of instructions that have been fetched by a fetch unit 135. The fetch unit has access to one or more levels of cache, for example the instruction cache 140 and any lower levels of cache within a cache hierarchy, and initially seeks to fetch instructions from the instruction cache 140. In the event of a cache miss, the requests are propagated to a lower level of the cache hierarchy and/or main memory, in order to retrieve into the fetch unit the instructions that need executing.

Exactly which instructions are fetched by the fetch unit is dictated by the output of a prediction queue 130 which includes storage to maintain a series of prediction results produced by branch prediction circuitry 100, with those prediction results then being analysed to determine a sequence of instructions to be fetched for execution by the processing circuitry. As will be understood by those skilled in the art, when stepping through a sequence of instructions at sequential memory addresses, when a branch instruction is encountered, this can cause a change in instruction flow, dependent on whether the branch instruction is taken or not taken. If the branch is not taken, then the next instruction to be executed will typically be the instruction immediately following the branch instruction (i.e. the one at the next incremented memory address), but if the branch is taken then instruction flow will branch to a target address that is determined for that branch instruction, such that the next instruction to be executed will be an instruction at that target address. Often, branch instructions can be conditional, and hence for any particular conditional branch instruction it will not always be the case that the branch is taken or not taken. Branch prediction circuitry 100 can be used to seek to make predictions as to whether a branch will be taken or not taken, and may include a variety of different types of branch prediction components for use in making such predictions. Often, one or more of those components will operate based on knowledge of the previous history of actual execution by the processing circuitry, with that information being forwarded over path 150 back to the branch prediction circuitry 100.

Often the branch prediction circuitry can be arranged to review blocks of instructions at a time, and each block may for example be referred to as a predict block herein. The predict block will in one implementation include a number of consecutive instructions in the memory address space, for example 8 consecutive instructions. The branch prediction circuitry will seek to analyse the block of instructions in order to predict whether one or more of those instructions are branch instructions, and in the event that they are branch instructions, may seek to provide a prediction as to whether the branch is taken or not taken. This results in the generation of a prediction result for each predict block, which can be routed via combinatorial logic 125 to produce prediction results that are fed into the prediction queue 130. The prediction queue can then analyse these prediction results in order to determine which instructions should be fetched by the fetch unit for execution by the processing circuitry. In the event that the predictions made by the prediction circuitry are accurate, this can significantly improve performance, since the appropriate instructions can be fetched from the instruction cache 140/lower levels of the memory hierarchy in advance of them being required by the processing circuitry, avoiding the need to await the actual outcome of the branch instruction before fetching the next instructions. In the event that a branch prediction proves to be incorrect, then the state of the processing circuitry can be restored to the point prior to the misprediction taking place, and processing can then resume from that point.

In addition to predicting whether a branch will be taken or not taken, which can be referred to as branch direction prediction, the branch prediction circuitry may also perform other forms of branch prediction, for example seeking to predict the target address of a branch that is predicted as taken. However, for the purposes of the following discussion, the discussion of the activities of the branch prediction circuitry will concentrate on the branch direction prediction made by the branch prediction circuitry.

The branch prediction circuitry 100 may include main branch outcome prediction circuitry 105 that can comprise one or more branch direction predictors for seeking to predict a branch outcome of a branch instruction, and in particular whether that branch is predicted as taken or not taken. The predictions made will typically be influenced by the branch history 110 maintained to take into account the actual outcome information obtained from the processing circuitry 145 when branch instructions are executed, and hence taking into account the true taken/not taken behaviour of the branch instructions.

Figure 2A:
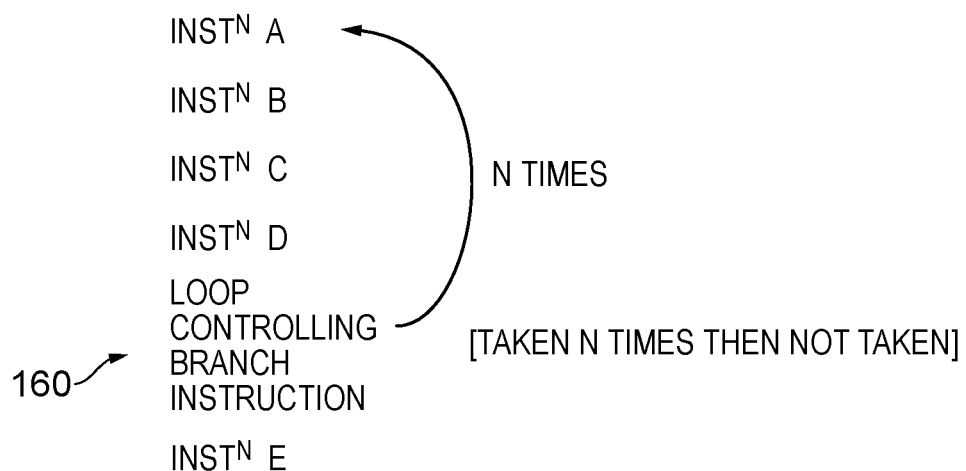
FIGS. 2A and 2B illustrate two different forms of loop controlling branch instruction that may be employed.
Figure 2B:
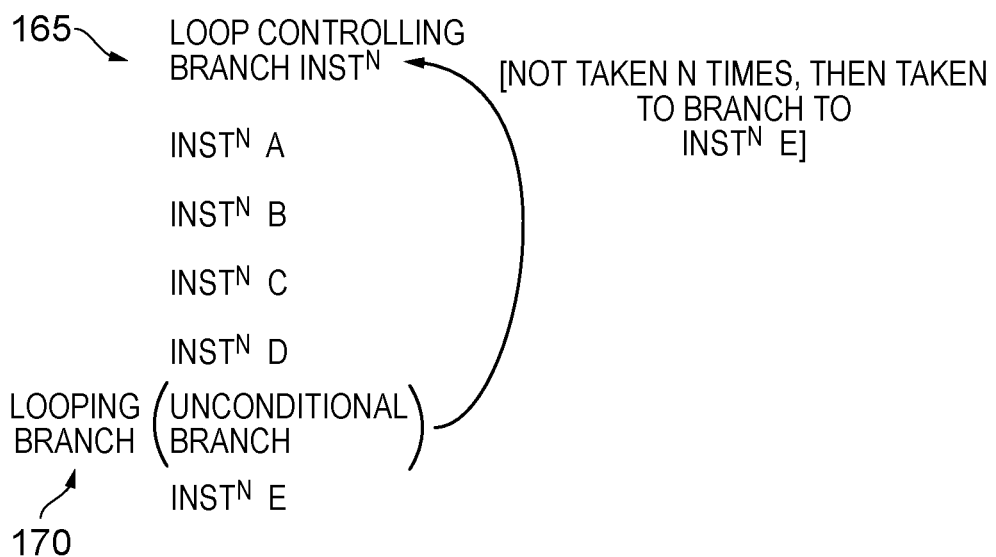

In addition to the main branch outcome prediction circuitry 105, the branch prediction circuitry 100 of FIG. 1 has a loop termination predictor 115 that is used to maintain branch outcome prediction information for one or more loop controlling branch instructions. Each loop controlling branch instruction is a branch instruction that is used to control repeated execution of a loop that comprises a number of instructions. Two examples forms of loop controlling branch instruction are shown in FIGS. 2A and 2B. FIG. 2A illustrates a sequence of instructions at consecutive memory addresses, where a loop controlling branch instruction 160 exists between instruction D and instruction E. When the loop controlling branch instruction is taken, the target address for the loop controlling branch instruction is the address of instruction A, and hence the loop controlling branch instruction identifies that instructions A to D form a loop. Due to the nature of the loop controlling branch instruction 160 it is expected that the loop controlling branch instruction will be taken a significant number of times, and then on the final iteration of the loop will not be taken, such that the next instruction to be executed thereafter will be instruction E. Once the loop has been initiated, the loop controlling branch instruction will be encountered frequently, and a prediction will be made each time for that loop controlling branch instruction. Each time a prediction is made, then the branch history 110 can be updated. This can cause a number of issues for a standard branch direction predictor. Firstly, the branch history will typically be of a finite size, and will quite quickly become heavily influenced by the predictions made in respect of the multiple instances of the loop controlling branch instruction. This can adversely affect the prediction accuracy that can be made with regard to other branch instructions. Further, on the final iteration of the loop controlling branch instruction, the prediction will be wrong, since by that stage it is expected that the normal branch prediction circuitry will predict the loop controlling branch instruction as strongly taken, and accordingly will also predict the loop controlling branch instruction as taken when the final iteration is reached. The loop termination predictor 115 is provided to alleviate the above problems.

In particular, when a misprediction is made using the standard branch prediction circuitry 105 for a branch instruction that has been strongly predicted correctly beforehand, then an entry can be made within the loop termination predictor 115 since it is likely that such a branch instruction will be a loop controlling branch instruction. The loop termination predictor is then arranged to monitor the behaviour of that loop controlling branch instruction for a number of future occurrences of the loop, in order to seek to determine whether a stable number of iterations is observed for the loop. Once there is a certain level of confidence in the stability of the iteration count, then the loop termination predictor can be used to make future predictions each time the loop controlling branch instruction is encountered. In particular, considering the example of FIG. 2A, once for the loop controlling branch instruction 160 there is a threshold level of confidence that the iteration count of the associated loop is stable, then the entry associated with the loop controlling branch instruction 160 within the loop termination predictor can be viewed as an active entry, and thereafter predictions can be made for that loop controlling branch instruction each time the loop is executed. In accordance with the scheme in FIG. 2A, for the first N iterations, the loop termination predictor 115 will predict that the loop controlling branch instruction is taken each time it is encountered, but on a final iteration will predict that the loop controlling branch instruction is not taken.

As shown in FIG. 2B, another form of loop controlling branch instruction is the form 165 which can be provided at the beginning of a loop. In such instances there will typically be an unconditional branch, referred to herein as the looping branch instruction 170, which branches back to the loop controlling branch instruction 165, and hence defines the loop. It can be seen from a comparison of FIGS. 2A and 2B that in both instances the loop is effectively the same, and involves executing instructions A to D during each iteration of the loop. When using the form of loop controlling branch instruction in FIG. 2B, the branch outcome pattern for the loop controlling branch instruction will be different to that for the loop controlling branch instruction 160 of FIG. 2A, in that the loop controlling branch instruction 165 will be not taken N times, and then will be taken on a final iteration.

Figure 3:
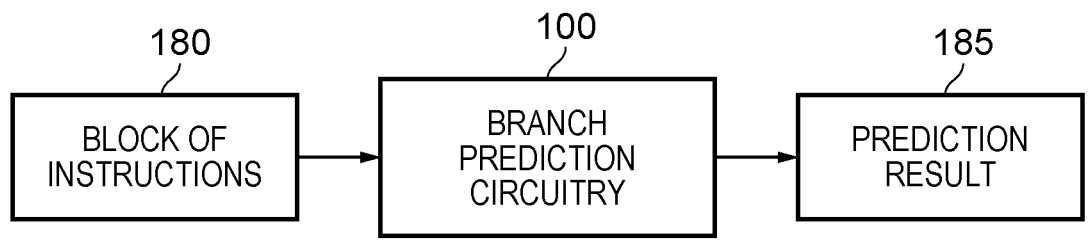
FIG. 3 illustrates how branch prediction circuitry can analyse a block of instructions in order to produce a prediction result.

FIG. 3 illustrates how the branch prediction circuitry 100 can be arranged to consider a block of instructions 180 and produce a prediction result for that block. The block of instructions will typically comprise a plurality of sequentially addressed instructions, and in one particular example is formed of 8 instructions. Starting with the instruction at the first memory address, the branch prediction circuitry seeks to predict whether any of the instructions in the block is a branch instruction, and if so seeks to predict the outcome of that branch instruction. Once a branch instruction is encountered that is predicted as taken, then no further analysis of any subsequent instructions in the block is necessary. The branch prediction circuitry 100 will then produce a prediction result 185 that identifies the instructions within the block that should be executed. In particular, it will identify one or more instructions that are to be executed, starting with the instruction at the first memory address. As soon as a branch instruction is encountered that is predicted as taken, then that forms the last instruction in the sequence to be executed, and is identified as such within the prediction result. The next block of instructions to be analysed by the branch prediction circuitry will in that instance be a sequence of instructions starting with the target address of the branch instruction that was predicted as taken.

From the above discussion, it will be appreciated that where loop controlling branch instructions can be identified, and the associated loop has a stable number of iterations, a more accurate prediction in respect of those loop controlling branch instructions can be made by the loop termination predictor 115, and its output can be used in preference to any prediction made by the main branch outcome prediction circuitry 105 for that branch instruction.

However as discussed earlier, a bandwidth prediction issue can arise, particularly when there is relatively high density of branch instructions within the sections of code being analysed. This will for example be the case when a relatively small loop is being repeatedly executed. In particular, the branch prediction circuitry will typically only be able to consider a small number of predict blocks per cycle, and in one particular instance may be arranged to consider up to two predict blocks per cycle. This can mean that the resultant prediction results may actually each only identify a relatively small number of instructions, and in such instances it is difficult for the prediction circuitry to get far enough ahead of the processing circuitry's actual execution of instructions to ensure that a steady stream of instructions can be forwarded from the fetch unit to the processing circuitry for execution.

However, as will be discussed in more detail herein, in the described examples a loop special condition detector 120 is provided in association with the loop termination predictor 115 that seeks to detect when a special condition is present for a loop whose associated loop controlling branch instruction has an allocated entry in the loop termination predictor 115. In particular, when a loop controlling branch instruction has an active entry in the loop prediction circuitry, and the special condition is detected in respect of the associated loop, the loop prediction circuitry is arranged to produce a prediction result that not only deals with the current iteration of the loop, but directly identifies multiple iterations of the loop that can be executed without the need for any intervening prediction to be made. The prediction queue 130 can then decompress such a form of prediction result in order to cause the fetch unit to dispatch to the processing circuitry the required instructions to cause those multiple iterations of the loop to be executed. The branch prediction circuitry can then resume making further predictions, starting from the instruction immediately following the last of the identified multiple iterations of the loop. This can significantly boost prediction bandwidth, such that even in the presence of small loops the prediction circuitry can get significantly ahead in its analysis of the code to ensure that there is no loss in performance when seeking to fetch instructions for execution by the processing circuitry.

The special condition can be determined to be present when the only branch instructions within the loop are the associated loop controlling branch instruction and any looping branch instruction provided to identify the loop. Hence, considering the example of FIG. 2A, if the only branch instruction within the loop is the loop controlling branch instruction 160, it is known that there will be no other branch instructions that need to be considered when executing the loop, and accordingly it is safe to directly predict multiple iterations of the loop. Similarly, for FIG. 2B, if the only branch instructions are the loop controlling branch instruction 160 and the unconditional looping branch instruction 170, then again it is known that no branch predictions need to be made for any of the other instructions within the loop, and hence again it is safe to directly predict multiple iterations of the loop.

However, if any of the other instructions within the loop are also branch instructions, then during each iteration a branch prediction will need to be made in respect of such a branch instruction. Further, since the branch prediction typically takes into account the previous history of branch instructions, it may be the case that the branch outcome for such a branch instruction will be different dependent on which iteration of the loop is being executed. In such a scenario, it would not be appropriate to directly predict multiple iterations of the loop, and instead it would be necessary to consider each iteration in turn. In particular, if one of those additional branch instructions is predicted as taken in a current iteration, then that will cause the prediction result for the current iteration to change, and hence the most accurate prediction is made by considering each iteration in turn.

However, in some instances it may still be possible to decide to indicate that the special condition is present even if there are one or more additional branch instructions within the loop. In particular, if any branch instruction within the loop, other than the loop controlling branch instruction and any looping branch instruction provided to identify the loop, is consistently predicted as not taken, then this may provide sufficient confidence to enable a single prediction result to be output identifying multiple iterations of the loop. Assuming that when those iterations are actually executed by the processing circuitry, any other branch instructions are indeed not taken, then the prediction will have been accurate, and the earlier-mentioned performance benefits can be realised.

Figure 4:
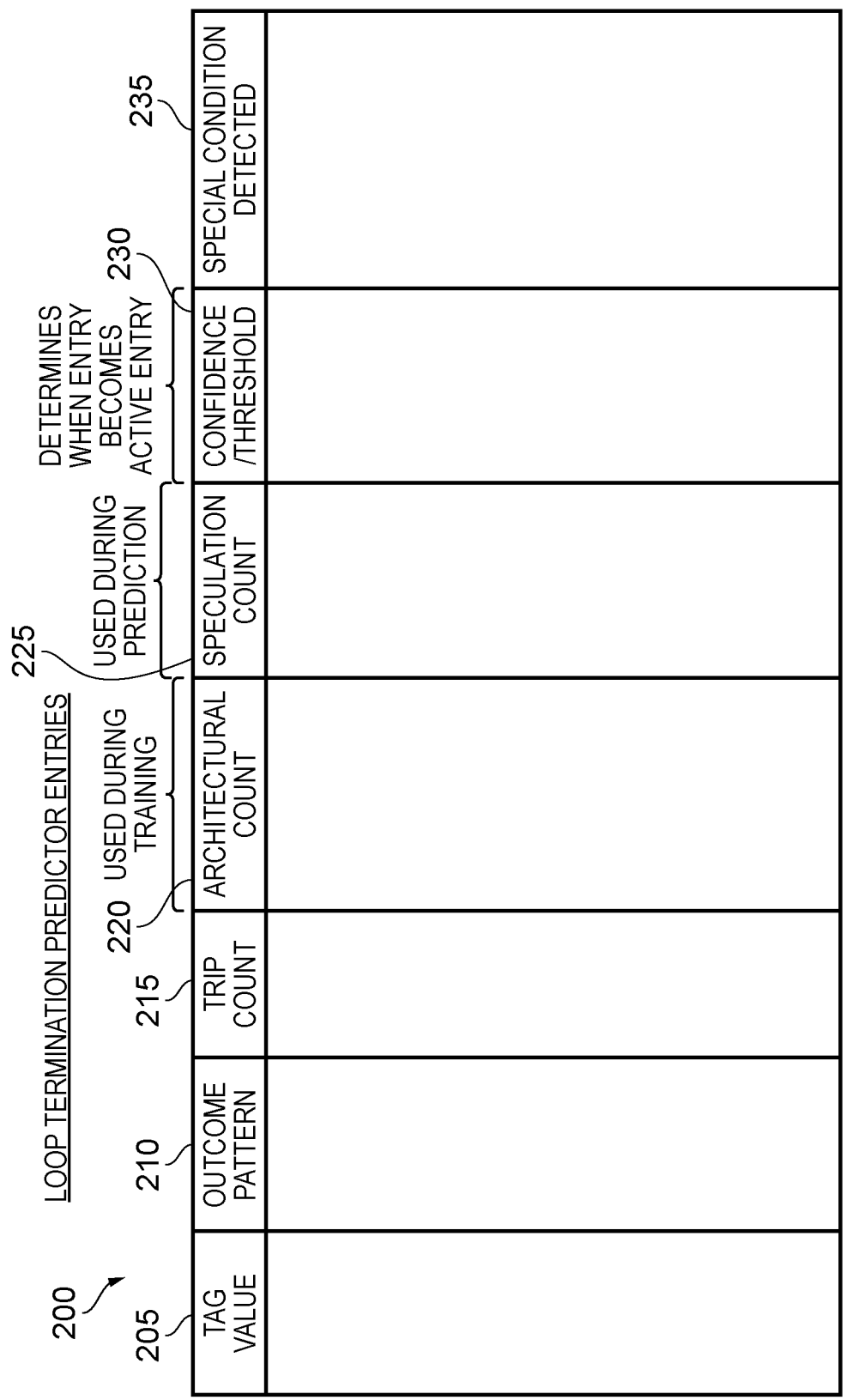
FIG. 4 illustrates the content of entries within the storage of the loop termination predictor of FIG. 1 in accordance with one example.

FIG. 4 is a block diagram illustrating various fields that can be provided within the predictor storage 200 of the loop termination predictor 115 in accordance with one example arrangement. A tag value field 205 is used to identify the loop controlling branch instruction that is associated with that entry, typically by storing a certain portion of the memory address of that instruction. The outcome pattern 210 is used to identify whether the associated loop controlling branch instruction is to be predicted as taken for all iterations except the final iteration, or to be predicted as not taken for all iterations except the final iteration. The trip count field 215 is used to identify the total number of iterations of the loop that occur between the loop being initiated and the loop being terminated, and during a training phase the loop termination predictor 115 is arranged to seek to determine whether that total iteration count is stable, when considering multiple occurrences of the loop.

The architectural count field 220 is used to keep track of the total number of iterations of the loop that have been executed and committed by the processing circuitry 145. Hence, during a first occurrence of the loop during the training phase, the architectural count field 220 will be used to keep track of the total number of iterations that have been executed, and then when the loop terminates, that value is written into the trip count field 215. The next time the loop is encountered, the architectural count field is again used to keep track of the total number of iterations that have been executed. Then, when the loop terminates, it is determined whether the count in the architectural count field is the same as the one in the trip count field 215. If so, then a confidence value in the confidence field 230 can be increased. This process can then be repeated for subsequent instances of the loop.

In one implementation, if at any point when a loop has finished being processed by the processing circuitry, it is determined that the current architectural count 220 differs to the currently recorded trip count 215, then the confidence is reset, and then again the architectural count value is written into the trip count value 215 to identify the most recently observed total number of iterations. If the confidence value reaches a certain threshold, indicative of a level of confidence being reached in the stability of the total iteration count, then the entry can begin to be used by the loop termination predictor to make future predictions.

In one implementation, the threshold can be increased each time the confidence is reset, so as to increase the number of times a stable iteration count needs to be observed before the confidence is considered high enough to start making predictions.

Once the threshold has been reached, then on a subsequent occurrence of the loop, the loop termination predictor can make a prediction as to the outcome of the loop controlling branch instruction for each iteration. Each time such a prediction is made, then the speculation count 225 is incremented, so as to keep track of the total number of predictions that have been made. This information can be used when determining how to reset the state of the processing circuitry in the event that a branch misprediction is made by the branch prediction circuitry 100 at some point. In particular, at certain checkpoints during execution of the code, the current value of the speculation count can be saved, so that if it subsequently becomes necessary to restore the state of the processing circuitry to that checkpoint, then the speculation count value 225 can be overwritten with the saved speculation count from that checkpoint.

In one specific implementation, assuming an in-order processor is used, then during the active phase (i.e. when predictions are being made) the architectural count field 220 can still be used, to keep track of iterations whose execution has been committed by the processing circuitry. This can provide a more efficient mechanism for checkpointing the speculation count for in-order processors. In particular, in the event of a misprediction, it may be sufficient to merely overwrite the speculation count value 225 with the current contents of the architectural count field 220. Purely by way of specific example, if the speculation count is currently 5 and the architectural count is currently 2, at the point where a misprediction is made, then the speculation count can be updated to 2, and when the processing circuitry resumes execution, predictions can continue to be made for the loop controlling branch instruction for the third and subsequent iterations.

In accordance with the techniques described herein, a further field 235 is provided in association with each entry, which can be set to identify when the special condition has been detected for the associated entry. Once the special condition has been detected, then as discussed earlier the loop termination predictor can be arranged to produce a prediction result that identifies multiple iterations of the loop, without the need for any intervening further predictions to be made.

Figure 5:
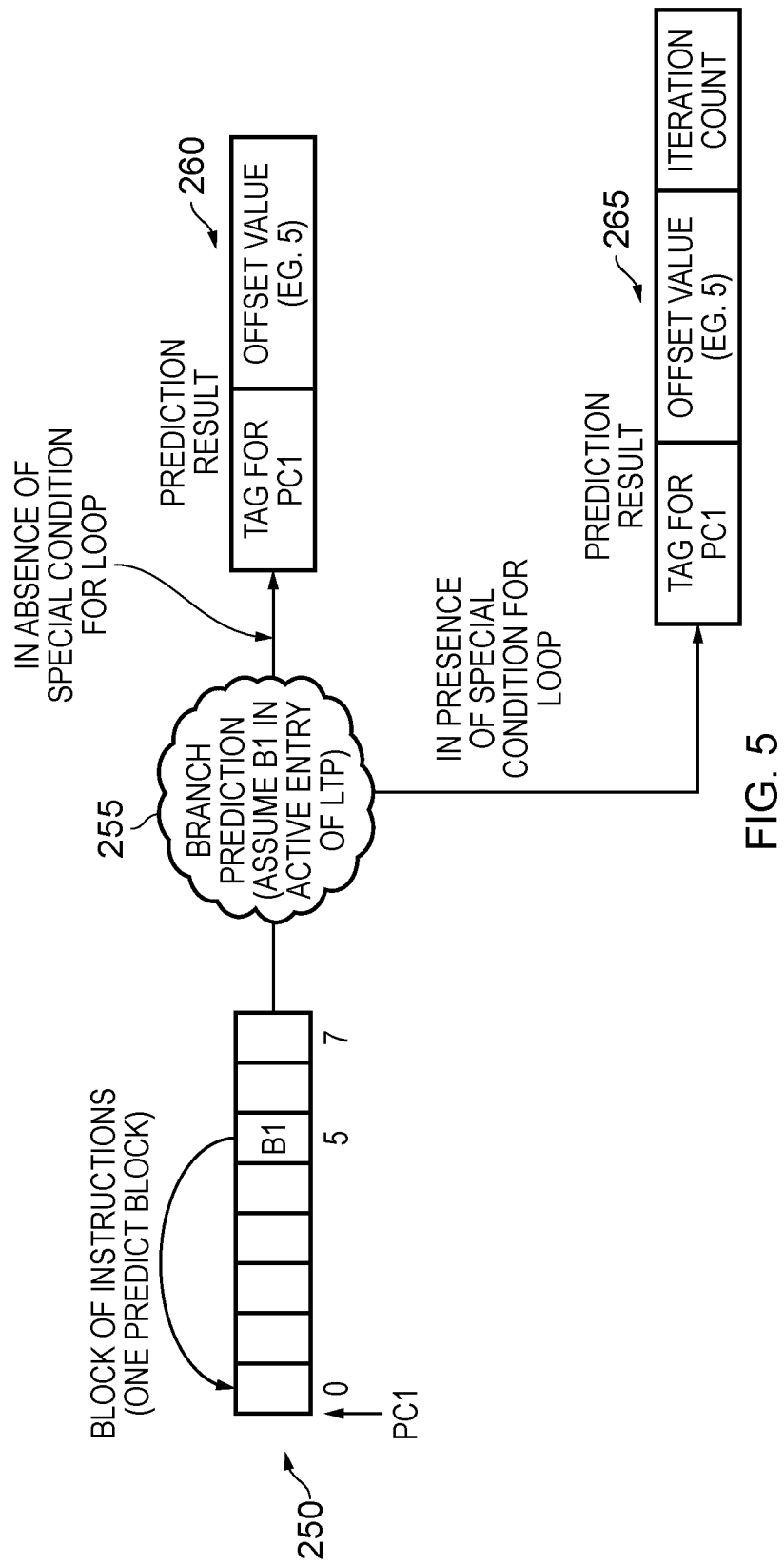
FIG. 5 illustrates one example of how a block of instructions may be analysed by the branch prediction circuitry.

FIG. 5 schematically illustrates how a block of instructions may be analysed by the branch prediction circuitry in one specific example. In this example, a predict block 250 consisting of 8 consecutive instructions is considered. In this instance, it is assumed that the branch instruction B1 is a loop controlling branch instruction that loops back to the beginning of a loop, the first instruction in the loop being the instruction at the address PC1. In this instance, the entire loop is within the single predict block being considered. As indicated by the bubble 255, the branch prediction circuitry can review the current predict block in order to produce a predict result. In the absence of the earlier-discussed special condition being present, then irrespective of whether the outcome for the branch instruction B1 is predicted by the loop termination predictor (due to there already being an active entry for the branch instruction B1) or by the main branch prediction circuitry 105, the prediction result will take the form shown by the element 260 in FIG. 5, assuming the branch instruction is predicted as taken. In particular, it is assumed at this point that the branch instruction B1 is the first branch instruction encountered that is predicted as taken, and accordingly all of the consecutive instructions between the instruction at PC1 and the branch instruction B1 will be executed. In this event, the prediction result 260 provides a tag field used to identify the address PC1, and then provides an offset value to identify the total number of instructions that should be executed. In the particular examples illustrated herein, the offset counts the additional instructions over and above the instruction at address PC1, and accordingly in this example identifies an offset of 5. When this prediction result is analysed by the prediction queue, it will cause the prediction queue to instruct the fetch unit to fetch six consecutive instructions starting from the address PC1, and to pass those instructions to the processing circuitry.

The next predict block to be considered will be the one that starts with the instruction at the target address of the branch instruction B1. In this case, this will again be the instruction at address PC1, and accordingly the same block of instructions will be considered again. As discussed earlier, it is typically the case that each iteration needs to be considered in turn, since there may be additional branch instructions between the first instruction and the loop controlling branch instruction whose behaviour will be dependent on the particular iteration executed. However, as discussed earlier, in the presence of the special condition, it will be determined that a prediction for multiple iterations can reliably be made in one go. In this case, the prediction result could be extended with a further field to identify the iteration count, i.e. the number of iterations of the loop (the loop being identified by the tag and offset values) that can be executed, as indicated by the prediction result 265 in FIG. 5. In this instance, the prediction queue will decompress this information so as to instruct the fetch unit 135 to fetch the instructions used to define the loop, and to then forward those instructions multiple times to the processing circuitry so as to cause the processing circuitry to execute multiple iterations of the loop.

The iteration count may in one example identify all of the iterations of the loop, or alternatively may merely identify a certain subset of iterations. Considering the examples of FIGS. 2A and 2B where the total number of iterations is N+1, then the iteration count can in principle identify all N+1 iterations, with the prediction queue being arranged when decompressing the prediction result to treat the final iteration as different. In particular, considering the example of FIG. 2A, it will determine that the final iteration will cause the loop controlling branch instruction not to be taken. Since the branch prediction circuitry can be arranged to resume its prediction activities starting from the instruction immediately after the loop has terminated, then the next prediction result to be reviewed will be the one whose first instruction starts at instruction E in FIG. 2A, and will identify a number of consecutive instructions to be executed starting from instruction E.

Figure 6:
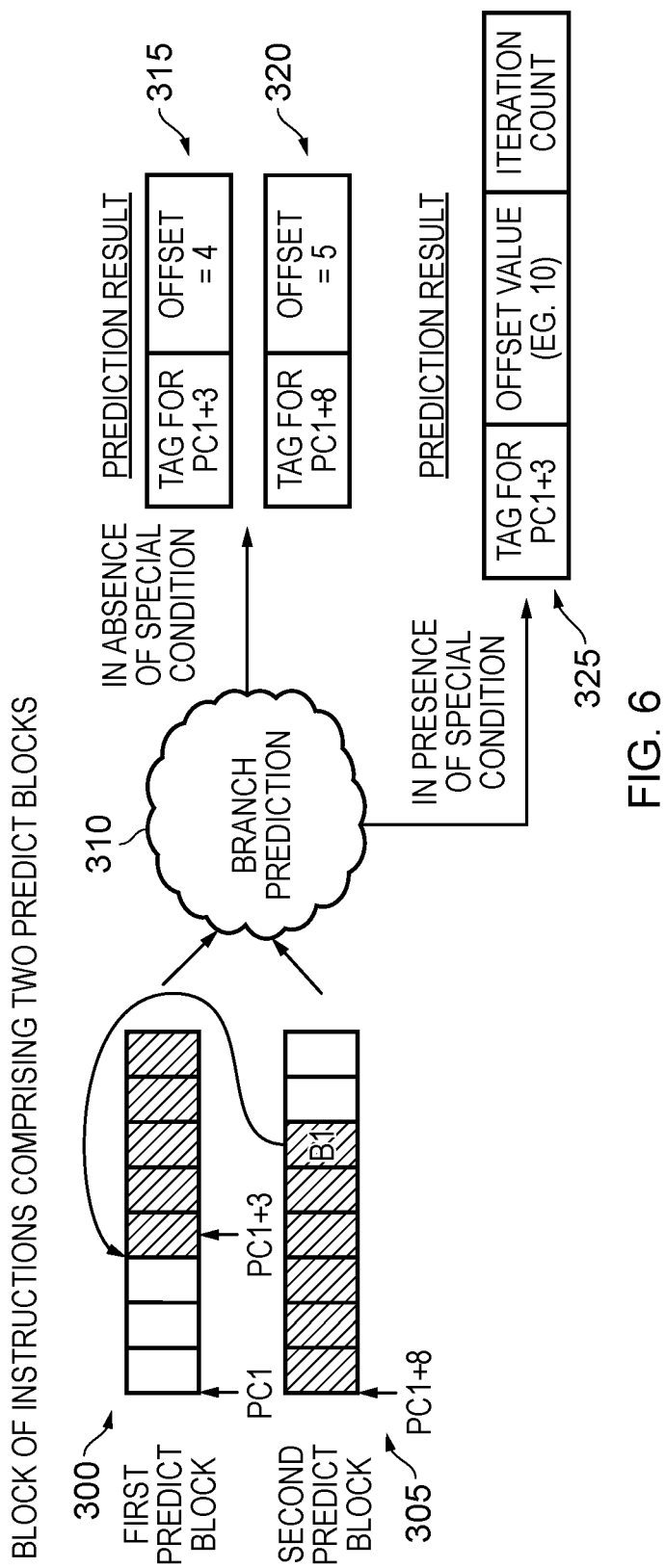
FIG. 6 illustrates another example of how the branch prediction circuitry may be used to analyse blocks of instructions.

FIG. 6 illustrates an alternative example where two predict blocks 300, 305 are being considered by the branch prediction circuitry, as indicated by the bubble 310. Each predict block again comprises eight instructions, and the instructions forming a loop are shaded within the predict blocks 300, 305. Accordingly, when the loop controlling branch instruction B1 is encountered, for each iteration other than the last iteration, that branch instruction is taken, and causes a branch back to instruction PC1+3.

In the example of FIG. 6 it is assumed that at least the first iteration of the branch has already been encountered, and accordingly when considering the first predict block 300, it is known that the first instruction to be executed is the one starting at address PC1+3. In the absence of the special condition, then the branch prediction circuitry will produce the two prediction results 315, 320. The first prediction result 315 relates to the first predict block 300, and identifies a tag for the instruction starting at address PC1+3, and identifies an offset of 4, indicating that all of the final five instructions in the predict block are to be executed. Similarly, the prediction result 320 relates to the predict block 305, and provides a tag for the address PC1+8, and an offset of 5 to identify that the first six instructions in the predict block are to be executed, finishing with the branch instruction B1.

However, in the presence of the special condition, based on knowledge of the loop associated with the loop controlling branch instruction B1, a single prediction result can be output such as the prediction result 325 shown in FIG. 6. This includes as the tag information the tag for the first instruction in the loop, namely the instruction at address PC1+3, and then specifies as an offset value a value defining all of the instructions in the loop. In this case, it will hence produce an offset of 10, to identify that 11 instructions in total should be executed starting from address PC1+3. Further, the iteration count then identifies the number of times that particular sequence of instructions is to be repeated. In one embodiment, the iteration count may here by one less than the total iteration count for the loop, assuming that on the first iteration a standard prediction result was produced.

Once a prediction result has been produced that identifies multiple iterations of a loop, then the branch history 110 within the branch prediction circuitry can be updated to take into account the fact that multiple iterations of the loop are to be executed based on the previous prediction result, and thereafter branch prediction can be resumed starting from the instruction first encountered after those multiple iterations of the loop have been executed.

Whilst in FIG. 6 the loop that is identified by the branch instruction B1 sits entirely within two predict blocks, this is not a requirement. The requirement is that the offset value field is sufficiently large to allow the total number of instructions within the loop to be identified. Assuming the offset value is big enough to accommodate that information, then the tag value can identify the first instruction in the loop, the offset value can identify all of the instructions forming the loop, and the iteration count can be used to identify how many times that loop needs to be executed. As mentioned earlier, it is small, simple loops that can have the most significant performance impact on prediction bandwidth, and it is exactly those small simple loops that are more likely to have the special condition associated with them, and hence which can benefit from the above described techniques. Hence, it will typically be the case that the offset value field will be sufficient to identify the total number of instructions within a loop of the type that is likely to have the special condition associated with it.

Figure 7:
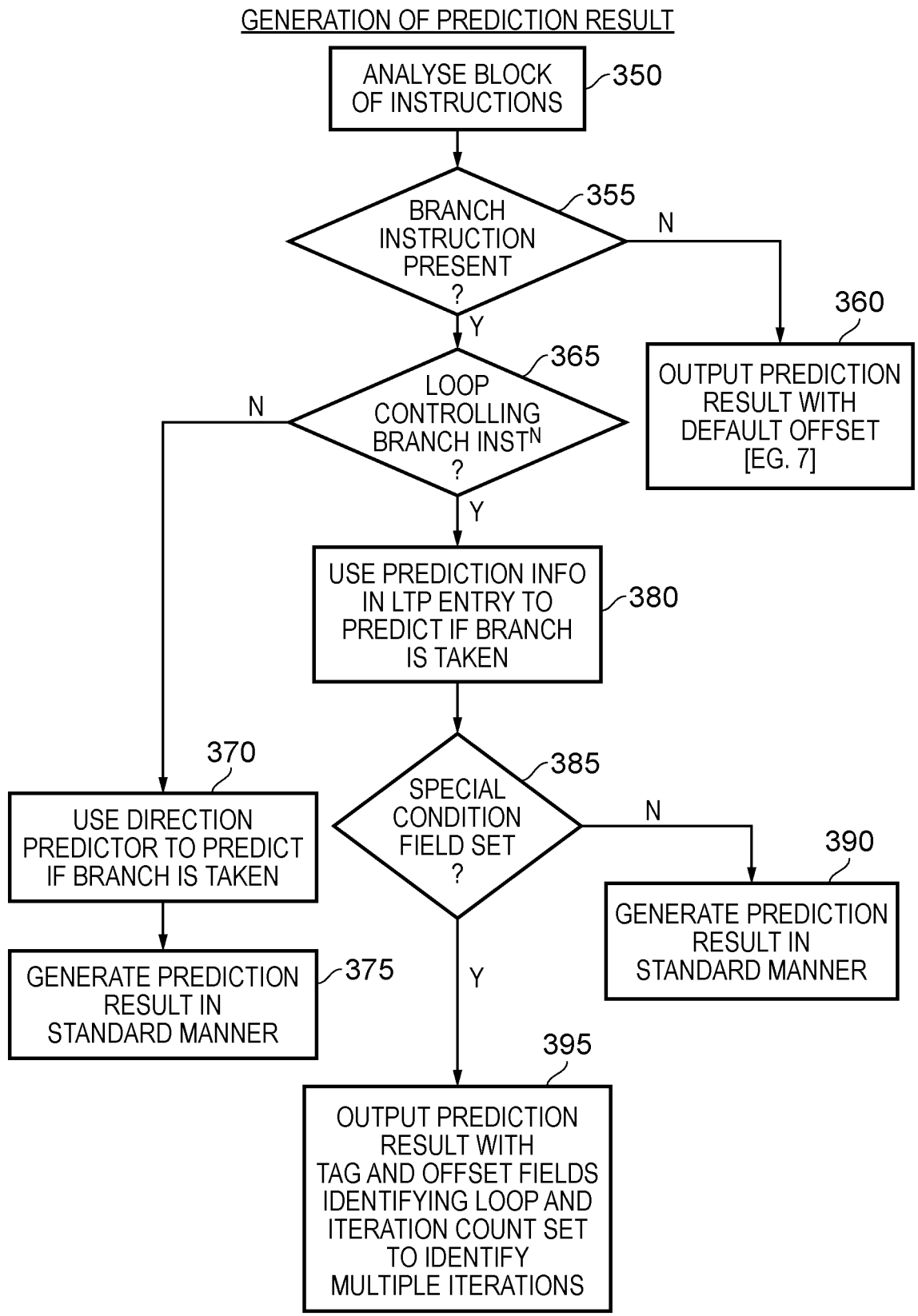
FIG. 7 is a flow diagram illustrating how the prediction result may be generated when analysing a block of instructions, in accordance with one example configuration.

FIG. 7 is a flow diagram illustrating how a prediction result is generated by the prediction circuitry in one example arrangement. At step 350, a block of instructions is analysed, whereafter at step 355 it is determined whether there is a branch instruction present within that block. If not, then the process proceeds to step 360 where the prediction result is output with a default offset. Hence, for example, if eight instructions are considered in a predict block, the default offset may be seven, identifying that all of the instructions in the predict block are to be executed.

However, if a branch instruction is present, the process proceeds to step 365. At step 365, it is determined whether the branch instruction is a loop controlling branch instruction, and if not the process proceeds to step 370. Here the direction predictor of the main branch outcome prediction circuitry 105 is used to predict if the branch is taken or not, and then a prediction result is generated in the standard manner at step 375. It should be noted however that if the direction predictor predicts the branch as not being taken, then the remainder of the predict block will be reviewed in order to determine if there is any other branch instruction present within the predict block, and if so that branch instruction will be considered before the prediction result is generated.

At step 365, it is determined whether the branch instruction is a loop controlling branch instruction, and in particular whether it is a loop controlling branch instruction for which an associated active entry is being maintained by the loop termination predictor. If so, then the prediction information in the loop termination predictor entry is used to predict if the branch is taken at step 380. Otherwise, the process will proceed to step 370 as discussed earlier.

Further, at step 385 it is determined whether the special condition field is set for the relevant entry in the loop termination predictor. If not, then the prediction result is generated in the standard manner at step 390. However, if the special condition field is set, then the process proceeds to step 395 where a prediction result is output with the tag and offset fields used to identify the loop, and with the iteration count set to identify multiple iterations of the loop. As discussed earlier, the iteration count may identify all of the remaining iterations of the loop, or some subset of the remaining iterations if desired. As discussed earlier, such a form of prediction result can then be decompressed by the prediction queue in order to instruct the fetch unit to pass the required instructions to the processing circuitry so as to cause multiple iterations of the loop to be executed, without the need for any intervening further prediction to be made.

Figure 8A:
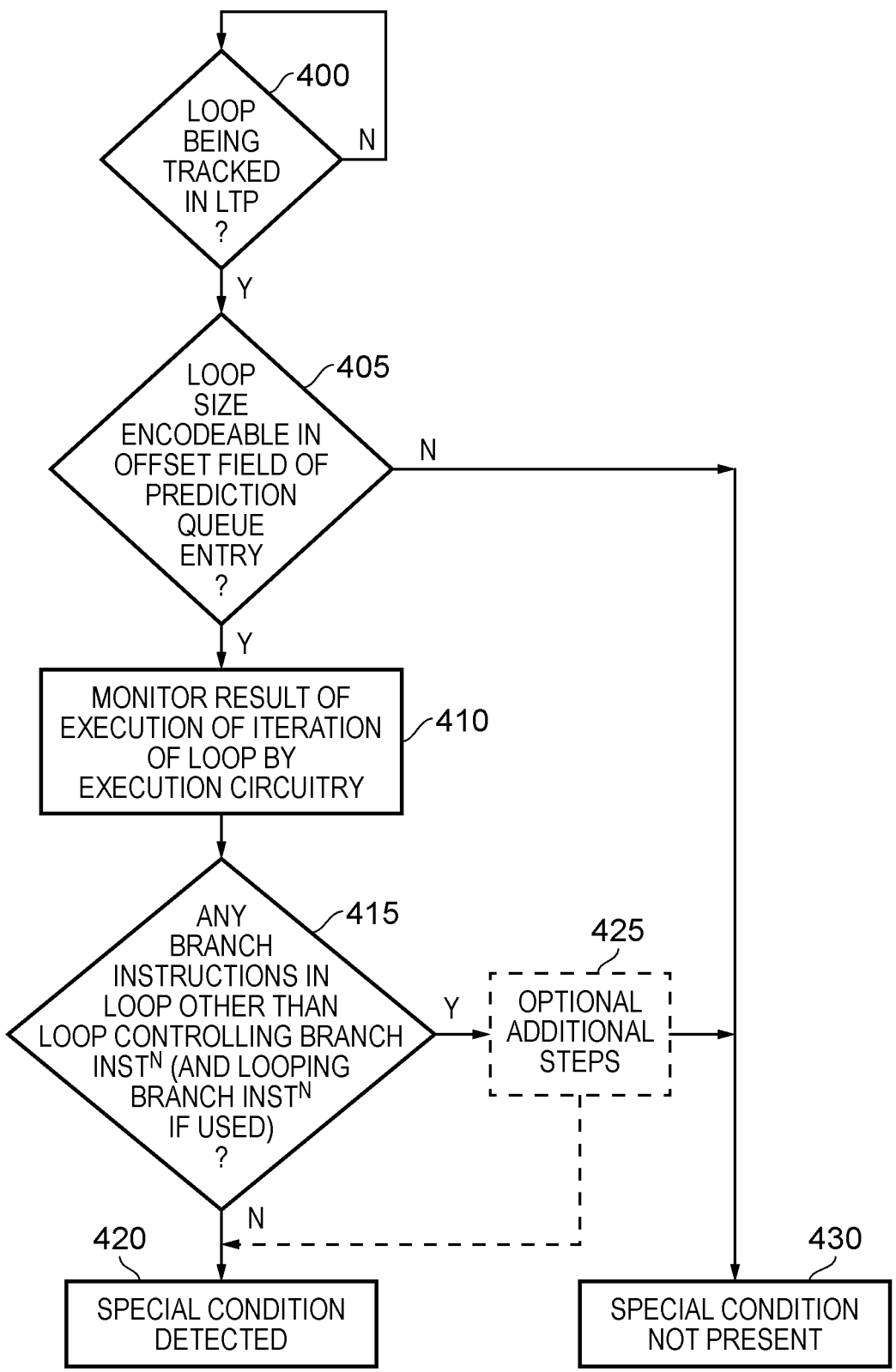
FIGS. 8A to 8C illustrate mechanisms that may be used to detect the presence of a special condition in accordance with example implementations.
Figure 8B:
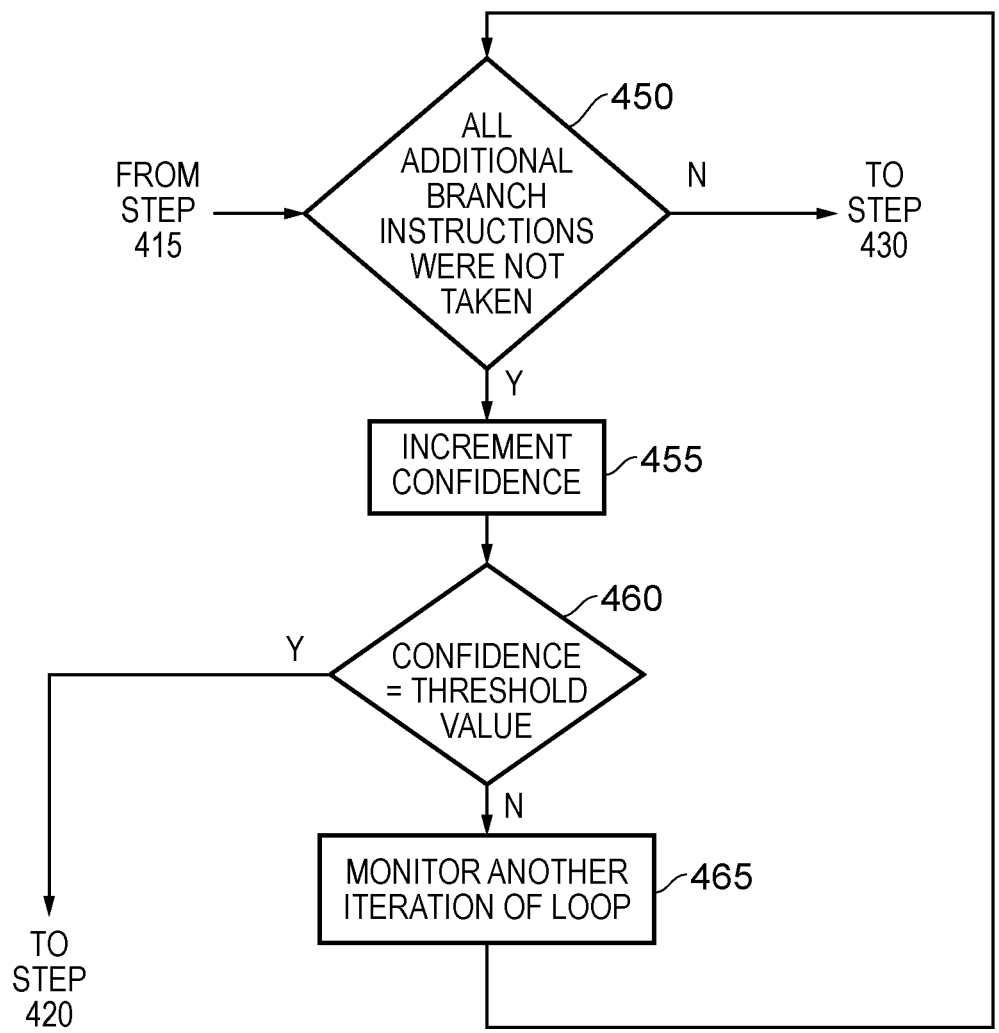

There are a number of ways in which the presence of the special condition can be detected by the loop special condition detector 120. FIGS. 8A and 8B are a flow diagram illustrating one sequence of steps that can be performed in order to detect the special condition, based on analysing the actual outcome of execution of certain instructions by the processing circuitry 145. At step 400, it is determined whether there is a loop being tracked within the loop termination predictor 115, and in one particular implementation it is determined whether that loop is being tracked by an active entry in the loop termination predictor, i.e. for the relevant entry there is a threshold level of confidence that the iteration count is stable.

Once it is determined that a loop is being tracked in the LTP, then at step 405 it is determined whether the loop size is encodable in the offset field of the prediction queue entry, and hence whether it is possible to fully identify the instructions of a loop with reference to the offset field. If not, then at step 430 it is determined that the special condition is not present.

However, assuming the loop size is small enough to enable it to be encodable in the offset field of a prediction queue entry, the process proceeds to step 410 where the result of execution of an iteration of the loop by the execution circuitry is monitored. Based on that information, it is then determined at step 415 whether there was any branch instructions in the loop other than the loop controlling branch instruction, and any looping branch instruction if used (as for example would be the case in the scenario of FIG. 2B). Since at this point the actual execution outcome of the processing circuitry is being monitored, then it can be known in absolute terms whether there are any other branch instructions in the loop, and if not the process proceeds to step 420 where it is determined that the special condition has been detected. Otherwise, the process proceeds to step 430 where the special condition is determined not to be present.

However, as indicated by the dotted box 425, some optional additional steps can first be taken following the "yes" branch of step 415, before it is finally determined whether the special condition is to be considered as present or not, and one example of such additional steps is illustrated in FIG. 8B. In particular, following the yes path from step 415, it can be determined at step 450 whether any such additional branch instructions were all identified as not taken. If this is not the case, then the process proceeds to step 430 where it determined that the special condition is not present. However, if this is the case, then a confidence is incremented at step 455, whereafter it is determined at step 460 whether that confidence is equal to a threshold value. It should be noted that this confidence is not necessarily the same as the level of confidence required to determine that the iteration count is stable, and hence may be an entirely separate confidence to the confidence held within the field 230 of the LTP entries shown in FIG. 4.

Once the confidence has reached a threshold value, then the process proceeds to step 420 where it is determined that the special condition has been detected.

However, if at step 460 it is determined that the confidence is not yet at the threshold, then another iteration of the loop is monitored at step 465. Then the process returns to step 450. It will be appreciated from FIG. 8B that if at any point it is determined that there are additional branch instructions that were not all predicted as not taken, then it will be determined that the special condition is not present.

Figure 8C:
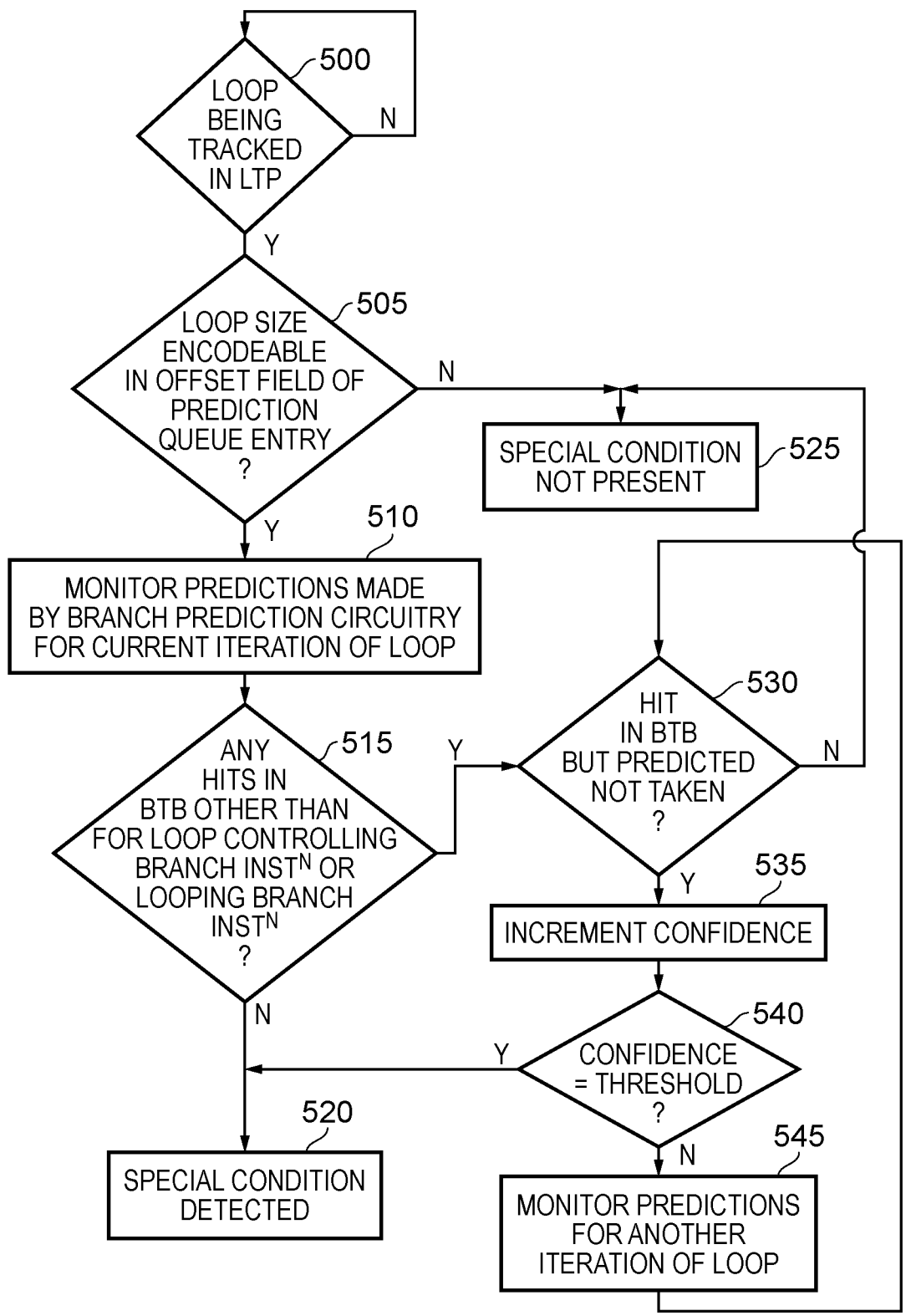

FIG. 8C is a flow diagram illustrating an alternative approach for detecting the presence of a special condition, based on monitoring the predictions previously made in respect of one or more iterations of the loop. Steps 500, 505 correspond to steps 400, 405 of FIG. 8A. Hence, if the loop size is not encodable in the offset field of the prediction queue, the process proceeds to step 525 where it is determined that the special condition is not present.

However, assuming the loop size is encodable in the offset field, then the process proceeds to step 510 where the loop special condition detector 120 is arranged to monitor the predictions made by the branch prediction circuitry for a current iteration of the loop. In one implementation, a branch target buffer (BTB) will be included as one of the components of the branch prediction circuitry, and is used to predict the target address of a branch instruction that is predicted as taken. At step 515, it is can be determined if there were any hits in the BTB other than for the loop controlling branch instruction or the looping branch instruction. If not, this implies that there are no other branch instructions within the loop, and accordingly the process proceeds to step 520 where it is determined that the special condition is detected.

However, if there is a hit for at least one other branch instruction in the BTB, then at step 530 it is determined whether the hit in the BTB related to a branch instruction that was actually predicted as not taken. If so, then the confidence is incremented at step 535, whereafter at step 540 it is determined whether the confidence is equal to the threshold. If so, then the special condition is detected at step 520, but otherwise the process proceeds to step 545 where the predictions made for another iteration of the loop are monitored, with the process returning to step 530. If at any point, prior to the confidence reaching the threshold, it is determined that there has been a hit in the BTB for a branch instruction that is predicted as taken, and that branch instruction is something other than the loop controlling branch instruction or the looping branch instruction, then the process proceeds to step 525 where it is determined that the special condition is not present.

FIG. 9 illustrates storage 600 that may be provided within the loop special condition detector 120 to monitor entries for which it is necessary to build up a certain level of confidence before indicating that the special condition is detected. Each entry includes a tag field 605 to identify the loop controlling branch instruction that is being monitored by the loop special condition detector, and a loop size field 610 to identify the size of the loop. In combination with the tag information, this can be used to identify exactly which instructions form the instructions within the loop, and hence enables a determination to be made as to when an iteration of the loop has been completed. A further field 615 can be used to maintain the confidence information that needs to reach a desired threshold level before it is determined that the special condition has been detected.

In one embodiment, the loop size and confidence fields 610, 615 can be incorporated as additional fields within the entries of the loop termination predictor storage shown in FIG. 4. Hence, in that case, in addition to the special condition detected field 235, two additional fields can be provided to identify the loop size and the confidence in the presence of the special condition.

From the above described example implementations, it will be appreciated that the techniques described herein enable situations to be identified where an entry maintained for a loop controlling branch instruction in loop prediction circuitry may be used not only to make a prediction for a current instance of the loop controlling branch instruction, but instead to identify the entire loop, and the performance of multiple iterations of the loop. This can significantly boost prediction bandwidth for certain special kinds of loops that are typically found frequently in code. This has been found to provide performance benefits in a variety of situations, and particularly in the case of very small loops where prediction bandwidth can be significantly impacted. Such loops are likely to be found to have the special condition associated with them, and hence lend themselves to being handled by the loop prediction circuitry in the manner discussed earlier, where a prediction result is produced that identifies multiple iterations of the loop.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
processing circuitry to execute instructions;
branch prediction circuitry to make branch outcome predictions in respect of branch instructions;
the branch prediction circuitry including loop prediction circuitry having a plurality of entries, each entry being used to maintain branch outcome prediction information for a loop controlling branch instruction that controls repeated execution of a loop comprising a number of instructions;
the branch prediction circuitry being arranged to analyze blocks of instructions and to produce a prediction result for each block that is dependent on branch outcome predictions made for any branch instructions appearing in the associated block;
wherein each prediction result identifies a first memory address, and an offset value used to identify a number of sequential instructions to be executed starting from the instruction at the first memory address; and
a prediction queue to store the prediction results produced by the branch prediction circuitry in order to determine the instructions to be executed by the processing circuitry;
wherein when the block of instructions being analyzed comprises a loop whose loop controlling branch instruction has an active entry in the loop prediction circuitry, and a determined condition is detected in respect of the loop, the loop prediction circuitry is arranged to produce a prediction result that further identifies an iteration count, and
the prediction result output by the loop prediction circuitry is arranged to cause the number of sequential instructions to be executed multiple times in order to implement multiple iterations of the loop, where the multiple times is determined from the iteration count.

2. An apparatus as claimed in claim 1, wherein following the loop prediction circuitry producing a prediction result that identifies multiple iterations of the loop, the branch prediction circuitry is arranged to resume making branch outcome predictions starting with a block of instructions after the multiple iterations of the loop.

3. An apparatus as claimed in claim 1, wherein:
the determined condition is that the only branch instructions within the loop are the associated loop controlling branch instruction and any looping branch instruction provided to identify the loop.

4. An apparatus as claimed in claim 1, wherein:
the determined condition is that any branch instruction within the loop, other than the loop controlling branch instruction and any looping branch instruction provided to identify the loop, is predicted as not taken.

5. An apparatus as claimed in claim 1, wherein for the determined condition to be detected as present, an offset field within the prediction result is required to be large enough to specify as the offset value a value identifying the number of instructions in the loop.

6. An apparatus as claimed in claim 1, wherein each entry in the loop prediction circuitry comprises a field to identify whether the determined condition has been detected in respect of the loop.

7. An apparatus as claimed in claim 6, wherein the determined condition is detected with reference to the execution of one or more previous iterations of the loop by the processing circuitry.

8. An apparatus as claimed in claim 6, wherein the determined condition is detected with reference to previous branch predictions made by the branch prediction circuitry in respect of the instructions forming the loop.

9. An apparatus as claimed in claim 8, wherein:
the determined condition is that any branch instruction within the loop, other than the loop controlling branch instruction and any looping branch instruction provided to identify the loop, is predicted as not taken; and
the determined condition is detected when, for each of a determined number of iterations of the loop, the branch prediction circuitry has predicted any branch instruction within the loop, other than the loop controlling branch instruction and any looping branch instruction provided to identify the loop, as not being taken.

10. An apparatus as claimed in claim 1, wherein the loop prediction circuitry is loop termination prediction circuitry, each entry in the loop termination prediction circuitry provides an iteration count identifying the number of times the loop is to executed before the loop terminates, and an entry becomes an active entry when a confidence in the iteration count reaches a predetermined level.

11. An apparatus as claimed in claim 10, wherein the branch outcome prediction information maintained in each entry of the loop termination prediction circuitry identifies an outcome pattern for the associated loop controlling branch instruction.

12. An apparatus as claimed in claim 11, wherein the outcome pattern identifies one of:
the loop controlling branch instruction will be taken N times, and then not taken;
the loop controlling branch instruction will not be taken N times, and then will be taken.

13. An apparatus as claimed in claim 12, wherein the multiple iterations identified in the prediction result are up to N+1 iterations.

14. An apparatus as claimed in claim 1, wherein:
the branch prediction circuitry comprises main branch outcome prediction circuitry in addition to the loop prediction circuitry, the main branch outcome prediction circuitry being arranged to make branch outcome predictions for branch instructions based on history information that is maintained in dependence on actual branch outcomes observed by the processing circuitry for branch instructions previously executed by the processing circuitry; and
the loop prediction circuitry is arranged to produce the prediction result for a current block of instructions in preference to the main branch outcome prediction circuitry when the current block contains a loop controlling branch instruction that the loop prediction circuitry has an active entry for.

15. An apparatus as claimed in claim 14, wherein:
when the loop prediction circuitry produces a prediction result that identifies multiple iterations of the loop, the branch prediction circuitry is arranged to update the history information to take into account the multiple iterations before enabling the main branch outcome prediction circuitry to resume making branch outcome predictions for branch instructions.

16. A method of performing branch prediction in an apparatus having processing circuitry for executing instructions, and branch prediction circuitry for making branch outcome predictions in respect of branch instructions, the method comprising:
providing within the branch prediction circuitry loop prediction circuitry having a plurality of entries, each entry being used to maintain branch outcome prediction information for a loop controlling branch instruction that controls repeated execution of a loop comprising a number of instructions;
employing the branch prediction circuitry to analyze blocks of instructions and to produce a prediction result for each block that is dependent on branch outcome predictions made for any branch instructions appearing in the associated block;
wherein each prediction result identifies a first memory address, and an offset value used to identify a number of sequential instructions to be executed starting from the instruction at the first memory address;
storing within a prediction queue the prediction results produced by the branch prediction circuitry, in order to determine the instructions to be executed by the processing circuitry;
when the block of instructions being analyzed comprises a loop whose loop controlling branch instruction has an active entry in the loop prediction circuitry, and a determined condition is detected in respect of the loop, employing the loop prediction circuitry to produce a prediction result that further identifies an iteration count, and using the prediction result output by the loop prediction circuitry to cause the number of sequential instructions to be executed multiple times in order to implement multiple iterations of the loop, where the multiple times is determined from the iteration count.

17. An apparatus comprising:
processing means for executing instructions;
branch prediction means for making branch outcome predictions in respect of branch instructions;
the branch prediction means including loop prediction means having a plurality of entries, each entry being used to maintain branch outcome prediction information for a loop controlling branch instruction that controls repeated execution of a loop comprising a number of instructions;
the branch prediction means for analyzing blocks of instructions and for producing a prediction result for each block that is dependent on branch outcome predictions made for any branch instructions appearing in the associated block;
wherein each prediction result identifies a first memory address, and an offset value used to identify a number of sequential instructions to be executed starting from the instruction at the first memory address; and
prediction queue means for storing the prediction results produced by the branch prediction means in order to determine the instructions to be executed by the processing means;
wherein when the block of instructions being analyzed comprises a loop whose loop controlling branch instruction has an active entry in the loop prediction circuitry, and a determined condition is detected in respect of the loop, the loop prediction means is arranged to produce a prediction result that further identifies an iteration count, and the prediction result output by the loop prediction means is arranged to cause the number of sequential instructions to be executed multiple times in order to implement multiple iterations of the loop, where the multiple times is determined from the iteration count.

* * * * *